United States Patent [19]

Lang

[11] 4,025,821

[45] May 24, 1977

[54] CIRCUIT BREAKER WITH IMPROVED TRIP MEANS HAVING A HIGH RATING SHUNT TRIP

[75] Inventor: Walter W. Lang, Beaver Falls, Pa.

[73] Assignee: Westinghouse Electric Corporation, Pittsburgh, Pa.

[22] Filed: Mar. 10, 1976

[21] Appl. No.: 665,598

[52] U.S. Cl. .............................. 361/111; 323/22 Z; 361/93

[51] Int. Cl.² .............................. H02H 1/04

[58] Field of Search ........ 317/16, 31, 33 R, 33 VR, 317/52, 54, 57, 60 R; 307/318; 323/22 Z, 75 F

[56] References Cited

UNITED STATES PATENTS

| | | | |
|---|---|---|---|
| 3,252,052 | 5/1966 | Nash | 317/57 X |
| 3,365,617 | 1/1968 | Flanagan | 307/318 X |
| 3,423,636 | 1/1969 | Rowley, Jr. | 317/16 X |
| 3,818,276 | 6/1974 | Jacobs | 317/54 |
| 3,939,363 | 2/1976 | Engel | 317/16 X |

*Primary Examiner*—Harry E. Moose, Jr.
*Attorney, Agent, or Firm*—Robert E. Converse, Jr.

[57] ABSTRACT

A circuit breaker comprises a stored energy mechanism and a solid state overcurrent sensing trip circuit. The circuit breaker also includes a remotely operable shunt trip device having a zener diode for operation from high voltage control circuits without the necessity for a stepdown transformer.

14 Claims, 3 Drawing Figures

CIRCUIT BREAKER WITH IMPROVED TRIP MEANS HAVING A HIGH RATING SHUNT TRIP

CROSS REFERENCES TO RELATED APPLICATIONS

The invention is related to subject matter disclosed in copending application Ser. No. 605,372, filed Aug. 15, 1975 by Walter William Lang and Alfred Eugene Maier (W.E. 45,633) and assigned to the assignee of the present invention.

BACKGROUND OF THE INVENTION

1. Field of the Invention:

The invention relates to circuit breakers and, more particularly, to circuit breakers having an automatic overcurrent trip capability and a manually operable shunt trip capability.

2. Description of the Prior Art:

A circuit breaker having an operating mechanism of the type herein disclosed is described in U.S. Pat. No. 3,808,567 issued Apr. 30, 1974 to Alfred E. Maier and assigned to the assignee of the present invention. A circuit breaker including a manually operable shunt trip device is described in the aforementioned copending U.S. Pat. application Ser. No. 605,372 (W.E. 45,633). The shunt trip device described therein includes a source of control voltage connected through a cut-off switch to a bridge rectifier circuit connected in parallel with the trip coil of the circuit breaker and the output of the solid state overcurrent tripping circuits. This arrangement is well suited to lower control voltages in the range of 32 to 120 volts, usually supplied through a stepdown transformer. The transformer produces a filtering effect which provides suppression of overvoltage spikes and other noise components of the control voltage. It would be desirable to operate the shunt trip device of a circuit breaker directly from higher line voltages of, for example, 600 volts without the use of a stepdown transformer. However, this would require a much higher rating bridge rectifier device which is expensive and which would be susceptible to damage from overvoltage spikes. It would be desirable, therefore, to provide a low cost shunt trip device for operating the trip coil of a circuit breaker which is directly operable from higher line voltages without the use of a stepdown transformer, while providing protection to the trip coil and the solid state overcurrent trip circuit.

SUMMARY OF THE INVENTION

A circuit breaker comprises separable contacts and a stored energy mechanism releasable to trip open the contacts. The trip mechanism comprises a trip coil, the energization of which actuates the stored energy mechanism to automatically separate the contacts. A solid state overcurrent sensing circuit provides an energizing current to the trip coil upon overload current conditions through the circuit breaker contacts. A shunt trip device is provided which is directly operable from high voltage lines without the use of a stepdown transformer. The shunt trip device provides manually operable energizing current to the trip coil and protection from overvoltage conditions to the trip coil and the solid state overcurrent sensing circuit. The shunt trip device comprises a zener diode connected in parallel with the trip coil to provide a shunt path for high voltage transients and to rectify the alternating current control voltage for operating the trip coil. A cut-off switch is provided which is linked to the circuit breaker contacts to limit the duration of current flow through the zener diode and trip coil.

The shunt trip device provides a low cost method of manually tripping a circuit breaker while providing protection to the trip coil and the solid state overcurrent trip circuit.

BRIEF DESCRIPTION OF THE DRAWINGS

For better understanding of the invention, reference may be had to the preferred embodiment shown in the accompanying drawings, in which.

DESCRIPTION OF THE PREFERRED EMBODIMENT

Figure 1:
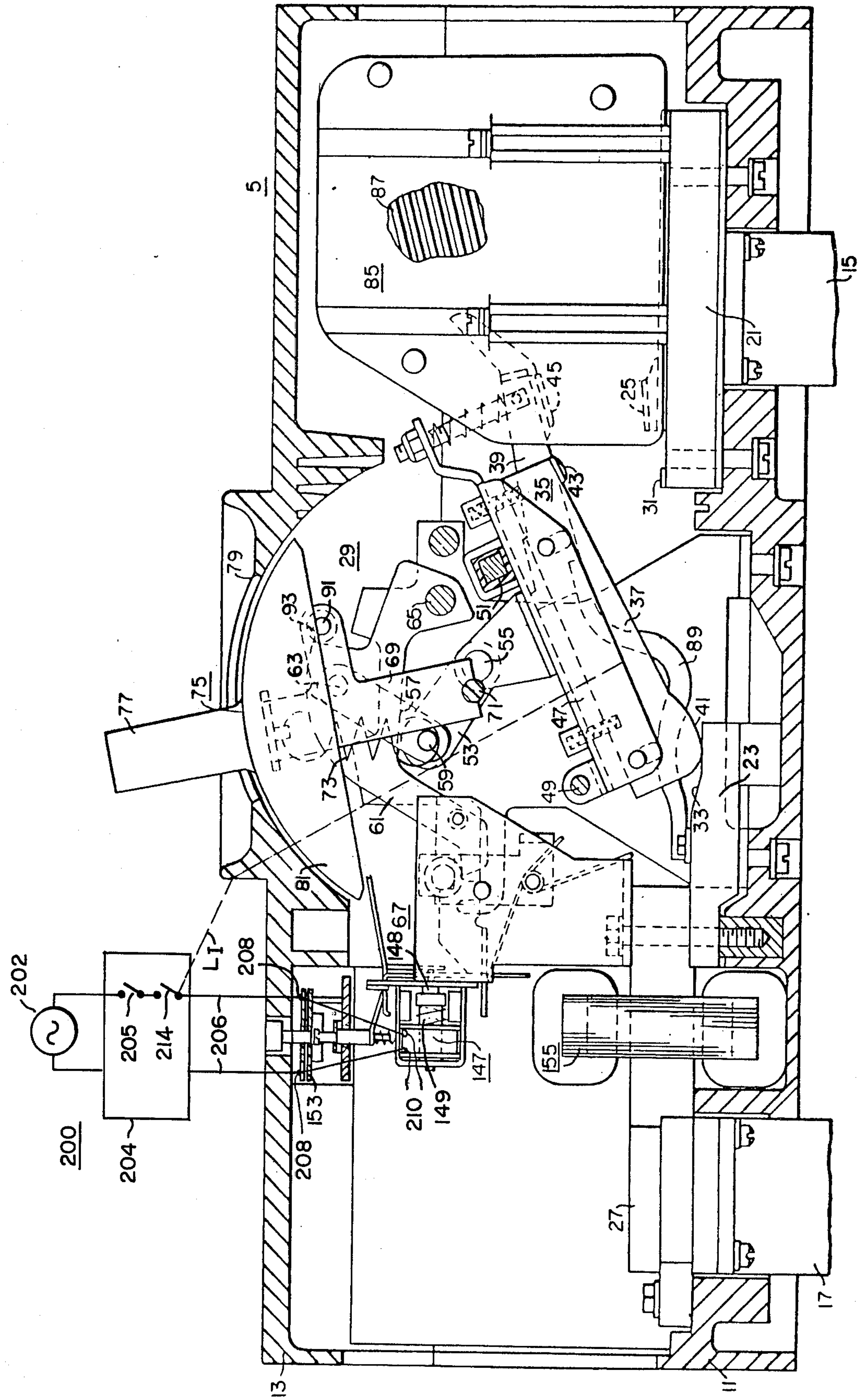
FIG. 1 is a side sectional view, with parts broken away, through the center pole unit of a three-pole circuit breaker incorporating the principles of the present invention.

Throughout the drawings, corresponding reference characters refer to corresponding elements.

Referring to the drawing, there is shown in FIG. 1 the center pole unit of a three-pole molded-case or insulating-housing type circuit breaker 5. The trip means of the circuit breaker 5 is more specifically described in U.S. Pat. No. 3,826,951 issued to A. E. Maier, et al, on July 30, 1974. the circuit breaker 5 comprises an insulating housing comprising a molded insulating base 11 and a molded insulated cover 13. Suitable insulating barrier means separates the housing 11, 13 into three adjacent insulating compartments for housing the three pole units of the three-pole circuit breaker in a manner well-known in the art. In each pole unit, two terminals 15 and 17 are provided at openings in the base 11 in proximity to the opposite ends of the housing to enable connection of the circuit breaker in an electric circuit.

In each of the three pole unit compartments of the circuit breaker, there are two spaced conductors 21 and 23 suitably secured to the base 11. The terminal 15 is secured to the flat undersurface of the conductor 21. A stationary contact 25 is fixedly secured to the front of the conductor 21. A rigid main conductor 27 is mounted on the base 11 and connected, at one end thereof, to the conductor 23. The other terminal 17 is connected to the flat undersurface of the conductor 27.

A single stored-energy type operating mechanism 29, for controlling all three pole units, is mounted in the center pole unit compartment of the circuit breaker. In addition to the stationary contact 25, there is a stationary contact 31 mounted on the conductor 21 and a stationary contact surface 33 on the conductor 23 in each pole unit of the circuit breaker. The operating mechanism 29 is operable to move a movable contact structure indicated generally at 35 between open and closed positions. The movable contact structure 35 comprises a plurality of main bridging contact arms 37 and an arcing contact arm 39. Each of the main bridging contact arms 37 comprises a contact surface 41 cooperable with the stationary contact surface 33 and a contact 43 cooperable with the contact 31, and the arcing contact arm 39 comprises a contact 45 cooperable with the stationary contact 25. The contact structure 35 supported on a contact carrier 47 that is supported for pivotal movement about a pivot pin 49. A rigid insulating tie bar 51 extends across all three pole units and is connected to the three contact carriers 47 to simultaneously move the three contact carriers 47 between open and closed positions. The contact carrier 47, for the center pole unit, is pivotally connected to a lower toggle link 53 by means of a pivot pin 55. The lower toggle link 53 is pivotally connected to an upper toggle link 57 by means of a knee pivot pin 59. The upper toggle link 57 is pivotally connected to a releasable trip member 61 by means of a pivot pin 63. The releasable trip member 61 is supported at one end thereof for pivotal movement about a fixed pivot pin 65. The releasable trip member 61 is latched, at the other end thereof, by means of a latch structure 67. An inverted generally U-shaped operating lever 69 is supported at the inner ends of the logs thereof for pivotal movement on a pair of fixed pins 71. The tension springs 73 are connected at the lower ends thereof to the knee pivot 59 and at the upper ends thereof to the bight portion of the operating lever 69. A handle structure 75 is connected to the front end of the operating lever 69 and comprises a handle part 77 that extends out through an opening 79 in the front of the cover 13. The handle structure 75 comprises a shroud 81 that substantially closes the opening 79 in all positions of the handle structure 75. In each pole unit, an arc-extinguishing structure 85 comprises a plurality of generally U-shaped magnetic plates 87 supported in a spaced stacked relationship. The arc-extinguishing structure 85 operates to extinguish arcs drawn between the contacts 25, 45 during opening operations in a manner well-known in the art.

In each pole unit, the arcing contact arm 39 is electrically connected to the conductor 23 by means of a flexible conductor 89. In the closed position of the contacts, the circuit through each pole unit extends from the terminal 17 through the conductor 27, the conductor 23, the movable contact structure 35, the conductor 21, to the other terminal 15. The main bridging contact arms 37 carry most of the current in the closed position of the contacts, and the current path through these contact arms extends from the contact surfaces 33, through the contacts 41, the bridging contact members 37, the contacts 43, to the contact 31. During opening operations, the main bridging contacts 43, 31 separate first and thereafter, the current is carried from the conductor 23 through the flexible conductor 89, the arcing contact arm 39, the arcing contact 45 and the arcing contact 25. When the arcing contact arm 39 separates an arc is drawn between the contacts 25, 45 and extinguished in the arc-extinguishing structure 85 in a manner well-known in the art.

The circuit breaker is shown in FIG. 1 in the open position with the releasable trip member 61 latched in the latched position shown by means of the latch mechanism 67. In order to close the circuit breaker, the handle 77 is moved in a clockwise direction from the off or open position to the on or closed position to move the operating lever 69 clockwise about the pivot 71. During this movement, the overcenter springs 73 are moved overcenter to erect the toggle 53, 57 to thereby pivot the movable contact structure 35 of a center pole unit in a clockwise direction about the pivot 49 to the closed position. With the three contact carriers 47 being connected for simultaneous movement by means of the tie bar 51, this movement serves to simultaneously move all three of the movable contact structures to the closed position. When it is desired to manually open the circuit breaker, the handle 77 is moved counterclockwise to the off position seen in FIG. 1. This moves the springs 73 overcenter to cause collapse of the toggle 53, 57 to thereby move the contact structures 35 to the open position illustrated in FIG. 1. Each of the contact carriers 47 and movable contact structures 35 moves about the associated pivot pin 49 with all of the contact carriers and movable contact structures moving about a common axis between the open and closed positions.

When the circuit breaker is in the closed position and an overload occurs in any of the three pole units or a manually initiated electronic command is provided, the releasable member 61 will be released, to automatically trip the circuit breaker open. Upon release of the releasable member 61 the springs 73, which are in a charged condition, rotate the trip member 61 in a clockwise direction about the pivot 65 to cause collapse of the toggle 53, 57, thereby moving the three contact carriers 47 and movable contact structures 35 to the open position in a manner well-known in the art. Upon tripping movement of the circuit breaker, the handle 77 is moved to an intermediate position in-between the "off" and "on" positions to provide a visual indication that the circuit breaker has tripped open.

Following a tripping operation, it is necessary to reset and relatch the circuit breaker mechanism before the contacts can be closed. Resetting and relatching is achieved by moving the handle 77 to a position past the off position. During this movement, a pin member 91 on the releasable member 61 engages a shoulder portion 93 on the releasable member 61, and the releasable member 61 is moved down to a position to relatch the latch structure 67 in a manner to be hereinafter described. Following relatching the handle 77, the releasable member 61 will again be reset and relatched in the position seen in FIG. 1. Thereafter, the circuit breaker can be operated in the same manner as was hereinbefore described.

The latch structure 67, more completely described in the aforementioned U.S. Pat. application Ser. No. 605,372 (W.E. 45,633), is automatically unlatched upon the occurrence of overload current conditions by means of a magnetic trip actuator indicated generally at 147. The magnetic trip actuator 147 is more specifically described in U.S. Pat. No. 3,783,423 issued to A. E. Maier, et al. on Jan. 1, 1974. The magnetic trip actuator 147 comprises an armature plunger 148 that is maintained in the inoperative position by magnetic means and is spring-biased towards an extended or actuating position by means of a spring 149. A static circuit board indicated generally at 153 (FIG. 1) is supported near the front of the breaker. The static circuit board 153 supports the components of a solid state overcurrent sensing circuit that is more specifically described in U.S. Pat No. 3,818,275 issued to A. B. Shimp on June 18, 1974. In each pole unit, a first current transformer indicated generally at 155 (FIG. 1) is supported around the associated conductor 27. Upon the occurrence of an overload in any of the pole units, the transformer 155 senses the overload and energizes a second transformer (not shown) to operate the sensing circuit 153 to pulse the magnetic trip actuator 147 thereby releasing the front armature plunger 148. The spring 149 then moves the armature plunger 148 to the right as seen in FIG. 1, thereby releasing the latch 61 and tripping the breaker. This operation is more specifically described in the abovementioned U.S. Pat. Nos. 3,783,423; 3,818,275 and 3,826,951.

Alternately, the trip actuator 147 may be manually operated by the shunt trip device 200, shown in FIG. 1. The shunt trip device 200 comprises a control voltage source 202 connected to a control circuit 204. The control device 200 can be manually operated by depressing the pushbutton switch 205 to cause the control circuit 204 to generate energizing current. The control circuit 204 is connected by leads 206 to the static circuit board 153 as by binding posts 208 at the output of the static circuit 153. The binding posts 208 are connected to the terminals 210 of the trip actuator 147.

Figure 2:
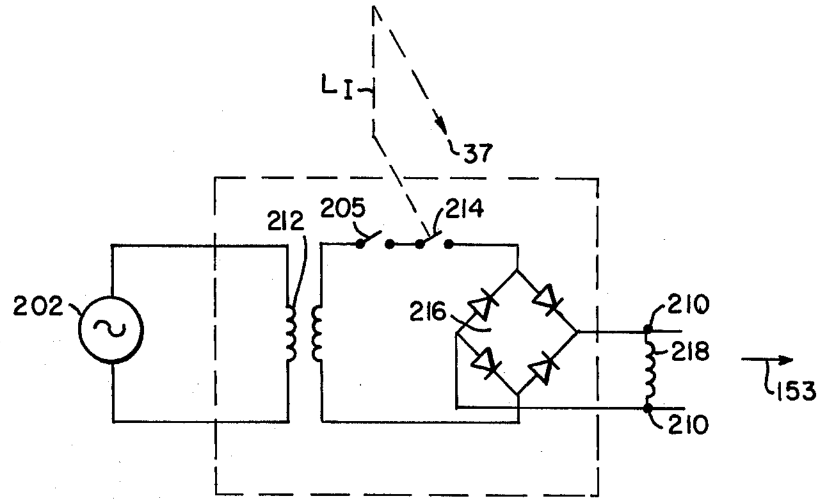
PRIOR ART FIG. 2
FIG. 2 is a schematic diagram of a control circuit for a prior art shunt trip device.

Referring now to FIG. 2, there is shown the control circuit of prior art shunt trip actuating devices. A transformer 212 is connected to the source of control voltage 202 and its output connected in series with a cut-off switch 214. The cut-off switch 214 is mechanically linked to the contact arm 37 as is shown schematically by linkage LI in FIG. 1. A bridge rectifier 216 has its input connected to the cut-off switch 214 and its output connected to the trip coil 218 of the trip actuator 147. When the contact arm 37 is in the closed circuit position thereby providing a current path through the circuit breaker 5, the cut-off switch 214 is similarly in a closed position. When the circuit breaker 5 is operated either automatically or manually to the open circuit position, the cut-off switch 214 is similarly operated to an open position.

In order to effect a manual shunt trip operation (with the circuit breaker in a closed position), the push-button switch 205 is closed. This completes a circuit to supply a low voltage, for example 32 to 120 volts from the output of the transformer 212 to the bridge rectifier 216. The rectifier bridge 216 then supplies direct current to the trip coil 218 thereby actuating the trip actuator 147 and effecting the automatic separation of the contacts 31, 43 of the circuit breaker 5. When the contact arm 35 moves to the open circuit position, the cut-off switch 214 is similarly moved to the open position, thereby deenergizing the trip coil 218. the use of a transformer 212 permits the use of lower voltage rating diode rectifiers in the bridge circuit 216. In addition, the transformer 212 provides a filtering effect thereby reducing the voltage transients to the bridge circuit 216, the trip coil 28, and the solid state sensing circuit 153.

Figure 3:
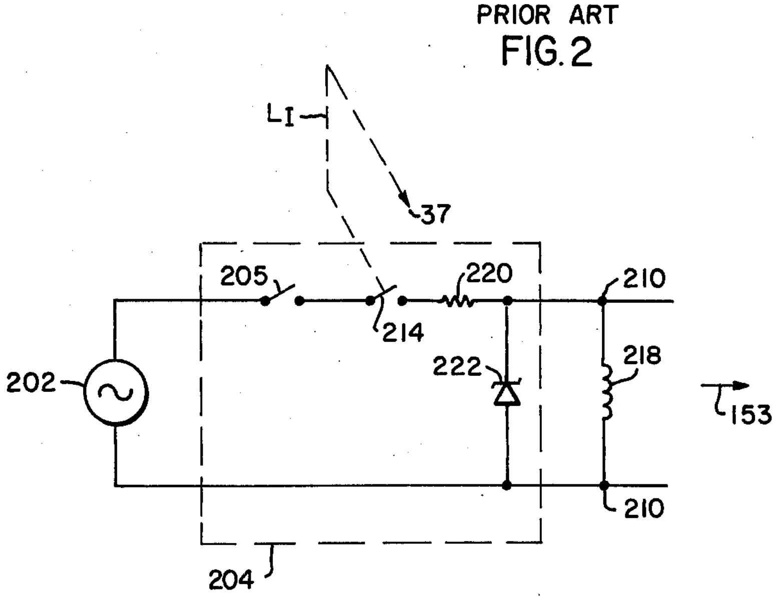
FIG. 3 is a schematic diagram of the control circuit for a shunt trip device which is the subject of the present invention.

The control circuit 204 of the present invention is shown in FIG. 3. The control voltage source 202 is directly connected to the pushbutton switch 205 and the cut-off switch 214, in series combination. Also connected in series with the two switches is a resistor 220. A zener diode 222 is connected in parallel with the series combination (the control voltage source, pushbutton switch 205, cut-off switch 214, and resistor 220) and the trip coil 218. The control voltage source can be of higher voltage, for example, 600 volts, in which case the resistor 220 may have a value of 6000 ohms and the zener diode 222 a rating of 200 volts. The operation of the shunt trip device shown in FIG. 3 is similar to the prior art device shown in FIG. 2. In order to manually initate a shunt trip operation, the pushbutton 205 is depressed. This supplies a 600 volt signal through the resistor 220 across the zener diode 222, which provides a shunt effect, thereby limiting the voltage seen by the trip coil 218 to approximately 200 volts. This energizes the trip coil 218, causing the trip actuator 147 to trip the circuit breaker 5 to the open circuit position as previously described. The linkage LI then opens the cut-off switch 214 to remove the control voltage from the resistor 220, zener diode 222, and trip coil 218.

The zener diode 222 serves two purposes. First, it provides half-wave rectification of the control signal to supply pulsating DC to the trip coil. Second, it suppresses high voltage transients, preventing damage to the trip coil 218 and the associated parallel connected solid state trip circuit 153. The resistor 220 serves to limit current through the trip coil 218 during positive half cycles and through the zener diode 222 on negative half cycles. Also, the voltage is divided between the resistor 220 and trip coil 218, permitting the use of a lower voltage zener diode.

Since the cut-off switch 214 deenergizes the shunt trip device upon tripping of the circuit breaker, the resistor 220, zener diode 222, and trip coil 218 are subjected to current flow for only a short period of time, for example, 1½ cycles. Therefore, the resistor 220 and zener diode 222 can be of reduced power rating, for example, 5 watts and 2 watts, respectively.

The shunt trip device 200 shown in FIG. 3 therefore allows operation directly from a high voltage line, providing significant cost savings over the alternative of merely uprating the prior art bridge rectifier design. The need for a transformer is also eliminated providing further cost savings.

It can be seen, therefore, that the invention provides a circuit breaker having a manual shunt trip device which exhibits greater flexibility and provides significant cost advantages over the prior art.

I claim:

1. A circuit breaker, comprising:
separable contacts;
a trip mechanism operable upon actuation to separate said contacts;
a trip coil operable upon energization to actuate said trip mechanism;
a sensing circuit coupled to said contacts and operable upon overcurrent conditions through said contacts to energize said trip coil; and
a shunt trip device connected to said trip coil and comprising a zener diode, said device being operable upon actuation to energize said trip coil and cause separation of said contacts.

2. A circuit breaker as recited in claim 1 wherein said trip mechanism comprises a flux transfer trip mechanism.

3. A circuit breaker as recited in claim 2 wherein said zener diode is connected in parallel circuit relationship with said trip coil.

4. A circuit breaker as recited in claim 3 wherein said shunt trip device comprises a cut-off switch adapted for series circuit connection with a control voltage source and an operating switch, said trip coil being adapted for parallel circuit connection with the series combination of said cut-off switch, a control voltage source and an operating switch; said cut-off switch being mechanically linked to said contacts so that said cut-off switch is open when said contacts are separated and is closed when said contacts are closed.

5. A circuit breaker recited in claim 4 further comprising a resistor connected in series circuit relationship with said cut-off switch.

6. A circuit breaker as recited in claim 5 wherein said sensing circuit comprises an input and an output, said input being coupled to the current path through said contacts and said output being connected across said trip coil in parallel current relationship with said zener diode.

7. A circuit breaker as recited in claim 6 wherein said sensing circuit comprises a solid state over-current sensing circuit.

8. A circuit breaker as recited in claim 1 wherein said zener diode is connected in parallel circuit relationship with said trip coil.

9. A circuit breaker as recited in claim 8 wherein said shunt trip device comprises a cut-off switch adapted for series circuit connection with the series connected combination of a control voltage source and an operating switch, said trip coil being adapted for parallel circuit connection with the series combination of said cut-off switch, a control voltage source and an operating switch; said cut-off switch being mechanically linked to said contacts so that said cut-off switch is open when said contacts are separated and is closed when said contacts are open.

10. A circuit breaker as recited in claim 9 further comprising a resistor connected in series circuit relationship with said cut-off switch.

11. A circuit breaker as recited in claim 10 wherein said sensing circuit comprises an input and an output, said input being coupled to the current path through said contacts and said output being connected across said trip coil in parallel circuit relationship with said zener diode.

12. A circuit breaker as recited in claim 11 wherein said sensing circuit comprises a solid state over-current sensing circuit.

13. In a circuit breaker having a trip coil and a shunt trip device of the type having a cut-off switch adapted for series connection with a control voltage source and an operating switch, the improvement comprising a zener diode connected in parallel with the trip coil of the associated circuit breaker.

14. In a circuit breaker having a trip coil and a shunt trip device of the type having a cut-off switch adapted for series connection with a control voltage source and an operating switch, the improvement comprising a resistor connected in series with said cut-off switch and a zener diode connection in parallel with the trip coil of the associated circuit breaker.

* * * * *